(12) United States Patent
Cheng

(10) Patent No.: US 9,968,230 B2
(45) Date of Patent: May 15, 2018

(54) SEAT-TYPE AIR EXTRACTING SUCTION APPARATUS TO AID BOWEL MOVEMENT

(71) Applicant: Chin Chang Trading Company, Pingtung, Pingtung County (TW)

(72) Inventor: Mao-Chi Cheng, Pingdong (TW)

(73) Assignee: Chin Chang Trading Company, Pingtung (TW)

( * ) Notice: Subject to any disclaimer, the term of this patent is extended or adjusted under 35 U.S.C. 154(b) by 6 days.

(21) Appl. No.: 15/103,936

(22) PCT Filed: Dec. 17, 2013

(86) PCT No.: PCT/CN2013/089643
§ 371 (c)(1),
(2) Date: Jun. 13, 2016

(87) PCT Pub. No.: WO2015/089723
PCT Pub. Date: Jun. 25, 2015

(65) Prior Publication Data
US 2017/0000303 A1 Jan. 5, 2017

(51) Int. Cl.
*A47K 11/04* (2006.01)
*A47K 17/00* (2006.01)
(Continued)

(52) U.S. Cl.
CPC .............. *A47K 17/00* (2013.01); *A47K 11/04* (2013.01); *A47K 13/00* (2013.01); *A47K 17/026* (2013.01);
(Continued)

(58) Field of Classification Search
CPC ...... A47K 17/026; A47K 17/00; A47K 11/04; A47K 2017/006; A45K 13/00; E03D 9/05;
(Continued)

(56) References Cited

U.S. PATENT DOCUMENTS

| 341,135 A | * | 5/1886 | Ellison | A47K 11/04 |
| | | | | 4/478 |
| 577,136 A | * | 2/1897 | Honeywell | A47K 11/04 |
| | | | | 297/462 |

(Continued)

FOREIGN PATENT DOCUMENTS

| CN | 103422558 A | 12/2013 |
| KR | 20030091855 A | 12/2003 |

(Continued)

*Primary Examiner* — Benjamin R Shaw
(74) *Attorney, Agent, or Firm* — Alan D. Kamrath; Kamrath IP Lawfirm, P.A.

(57) ABSTRACT

Disclosed is a seat-type air-extracting suction apparatus to aid bowel movement having a main body (10), a support frame (20), a vacuum motor (30) and a pressure regulation valve (40), wherein the main body (10) is provided with a loading housing (11), a seat cushion (13) and an extraction box (12), the loading housing (11) has a first through hole (111), the seat cushion (13) is provided on the loading housing (11) and is formed with a guidance hole (131), the guidance hole (131) is aligned with the first through hole (111) of the loading housing (11), the extraction box (12) penetrates through and is provided in the loading housing (11), and an internal space of the extraction box (12) corresponds to the first through hole (111). The support frame (20) is provided on the outside of the main body (10) and is provided with a starting switch (22). The vacuum motor (30) is connected to the main body (10) and is used for extracting air to reduce the pressure inside the loading housing (11), a negative pressure effect being created when extracting air via the vacuum motor (30), aiding the bowel movement of a user. The pressure regulation valve (40) is able to adjust the pressure inside the loading housing (11) to meet the comfort level of the user.

18 Claims, 5 Drawing Sheets

(51) Int. Cl.
  *E03D 9/05* (2006.01)
  *A47K 13/00* (2006.01)
  *A47K 17/02* (2006.01)
  *F16K 15/06* (2006.01)
  *F16K 15/18* (2006.01)

(52) U.S. Cl.
  CPC .............. *E03D 9/05* (2013.01); *F16K 15/063* (2013.01); *F16K 15/18* (2013.01); *A47K 2017/006* (2013.01)

(58) Field of Classification Search
  CPC ......... E03D 9/04; F16K 15/063; F16K 15/18; E03F 1/006
  USPC ....................................................... 4/478, 483
  See application file for complete search history.

(56) References Cited

U.S. PATENT DOCUMENTS

| | | | | | |
|---|---|---|---|---|---|
| 902,449 | A | * | 10/1908 | Price ...................... | A47K 11/04 297/423.4 |
| 1,428,627 | A | * | 9/1922 | Grabfelder ............. | A47K 13/00 248/436 |
| 1,947,373 | A | * | 2/1934 | Bickel ................... | A47K 11/04 4/239 |
| 4,376,702 | A | * | 3/1983 | Small ..................... | E03F 1/006 210/201 |
| 4,428,615 | A | * | 1/1984 | Hynson ................. | A61G 5/1002 297/118 |
| 4,920,587 | A | * | 5/1990 | Kerr ...................... | A47K 11/02 4/460 |
| 2006/0230510 | A1 | * | 10/2006 | Cheng .................... | A47K 11/02 4/431 |
| 2007/0044222 | A1 | * | 3/2007 | Hedberg ................ | A47K 11/04 4/321 |
| 2007/0074338 | A1 | * | 4/2007 | List ........................ | A47K 3/074 4/483 |
| 2008/0216220 | A1 | * | 9/2008 | Markaj ................... | E03D 9/052 4/213 |
| 2010/0301639 | A1 | * | 12/2010 | McPheeters ........... | A61G 9/003 297/118 |
| 2011/0138529 | A1 | * | 6/2011 | Hsiao ..................... | A47K 11/04 4/483 |
| 2011/0160683 | A1 | * | 6/2011 | Pinotti Barbosa .. | A61M 1/0031 604/319 |
| 2011/0219529 | A1 | * | 9/2011 | Diamond ............... | A47K 11/04 4/449 |

FOREIGN PATENT DOCUMENTS

TW    200630527    9/2006
TW    I313611 B    8/2009

* cited by examiner

SEAT-TYPE AIR EXTRACTING SUCTION APPARATUS TO AID BOWEL MOVEMENT

BACKGROUND OF THE INVENTION

1. Field of the Invention

The present invention relates to an air extracting suction apparatus, and more particularly to a seat-type air extracting suction apparatus to aid bowel movement that is mounted on a seat and assists a sitting user to excrete by generating a negative pressure of air suction.

2. Description of Related Art

Due to aging population structure recently, healthcare of aged people becomes important issues in the modern society. The elders' body functions deteriorate and cause clumsiness of movement. Excretion of those elders requires health caregivers' support or use of wheelchairs, which put lots of burdens on these health caregivers. Therefore, a conventional seat is mounted with a collection inside, and a top wall of the seat is mounted with a seat cushion and defined with a through hole. A user sitting in the seat may directly excrete merely with a health caregiver's assistance of clothing and unclothing, which eases the burden of the health caregiver.

Although the conventional seat helps the users that are unable to walk, most of such users have poor digestive functions and therefore have problems to excrete.

To overcome the shortcomings, the present invention provides a seat-type air extracting suction apparatus to aid bowel movement to mitigate or obviate the aforementioned problems.

SUMMARY OF THE INVENTION

The main objective of the invention is to provide a seat-type air extracting suction apparatus to aid bowel movement that is mounted on a seat and assists a sitting user to excrete by generating a negative pressure of air suction.

To achieve to aforementioned objective, the present invention employs a seat-type air extracting suction apparatus to aid bowel movement comprising:

a main body having
 a loading housing being rectangular and having a first through hole defined through the loading housing;
 a seat cushion mounted on the loading housing and having a guiding hole formed on the seat cushion and aligned with the first through hole; and
 an extraction box mounted through the loading housing into an internal space of the loading housing and having a receiving space aligned with the first through hole;
a support frame connected to an outside of the main body and having an activating switch;
a vacuum motor connected to the main body and having an air pipe mounted airtightly through a wall of the loading housing, wherein one of two open ends of the air pipe is connected to the vacuum motor, and the other open end of the air pipe communicates with the internal space of the loading housing; and
a pressure regulation valve is mounted through the loading housing.

A user may operate the pressure regulation valve to regulate the internal pressure of the loading housing to achieve optimum comfort for the user.

DETAILED DESCRIPTION OF THE PREFERRED EMBODIMENT

The technical means of the present invention used for achieving the predetermined objectives will be described in the following paragraphs with accompanied drawings and preferred embodiments of the present invention.

Figure 1:
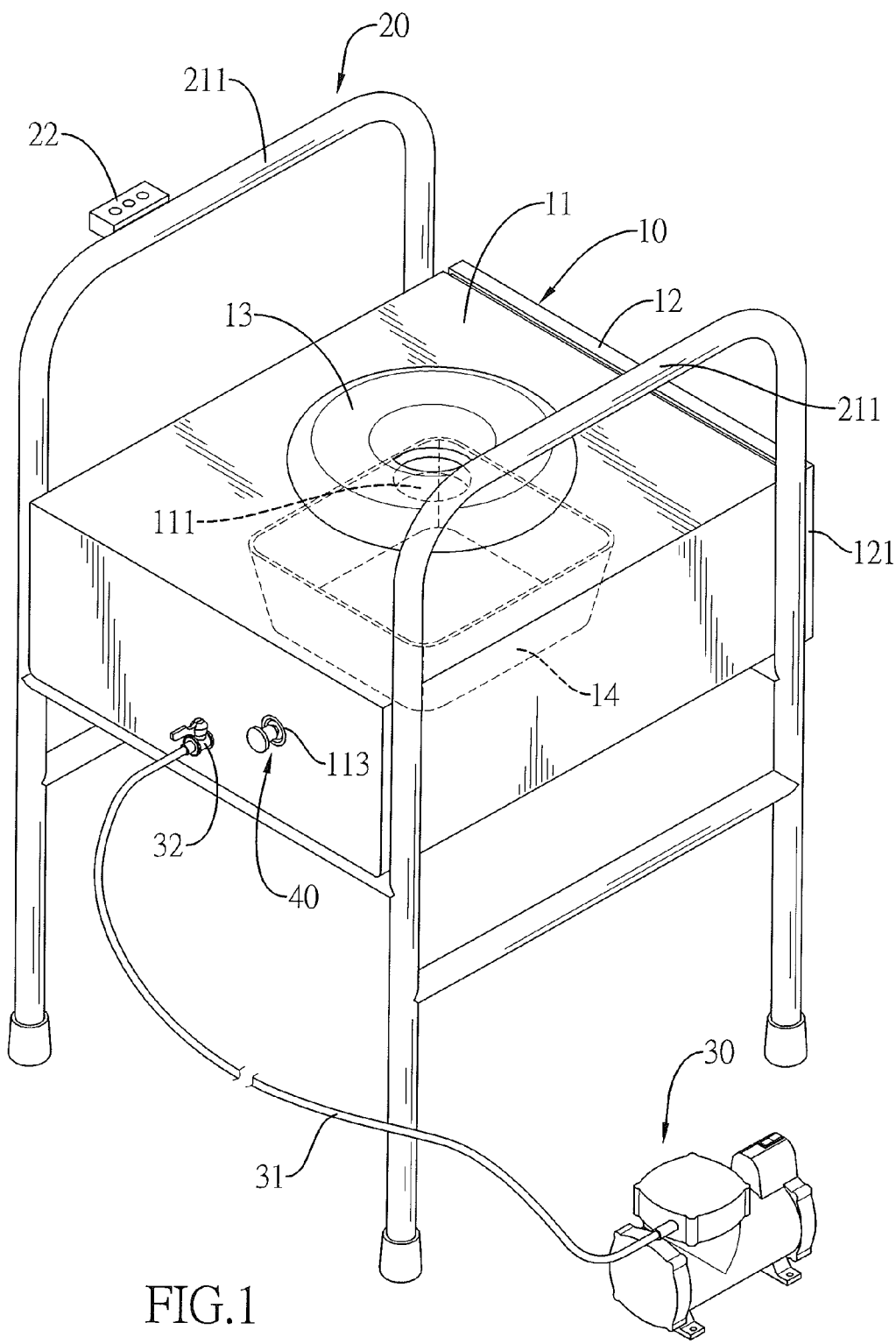
FIG. 1 is a perspective view of seat-type air extracting suction apparatus to aid bowel movement in accordance with the present invention.

With reference to FIG. 1, a seat-type air extracting suction apparatus to aid bowel movement of the present invention comprises a main body 10, a support frame 20, a vacuum motor 30 and a pressure regulation valve 40.

Figure 2:
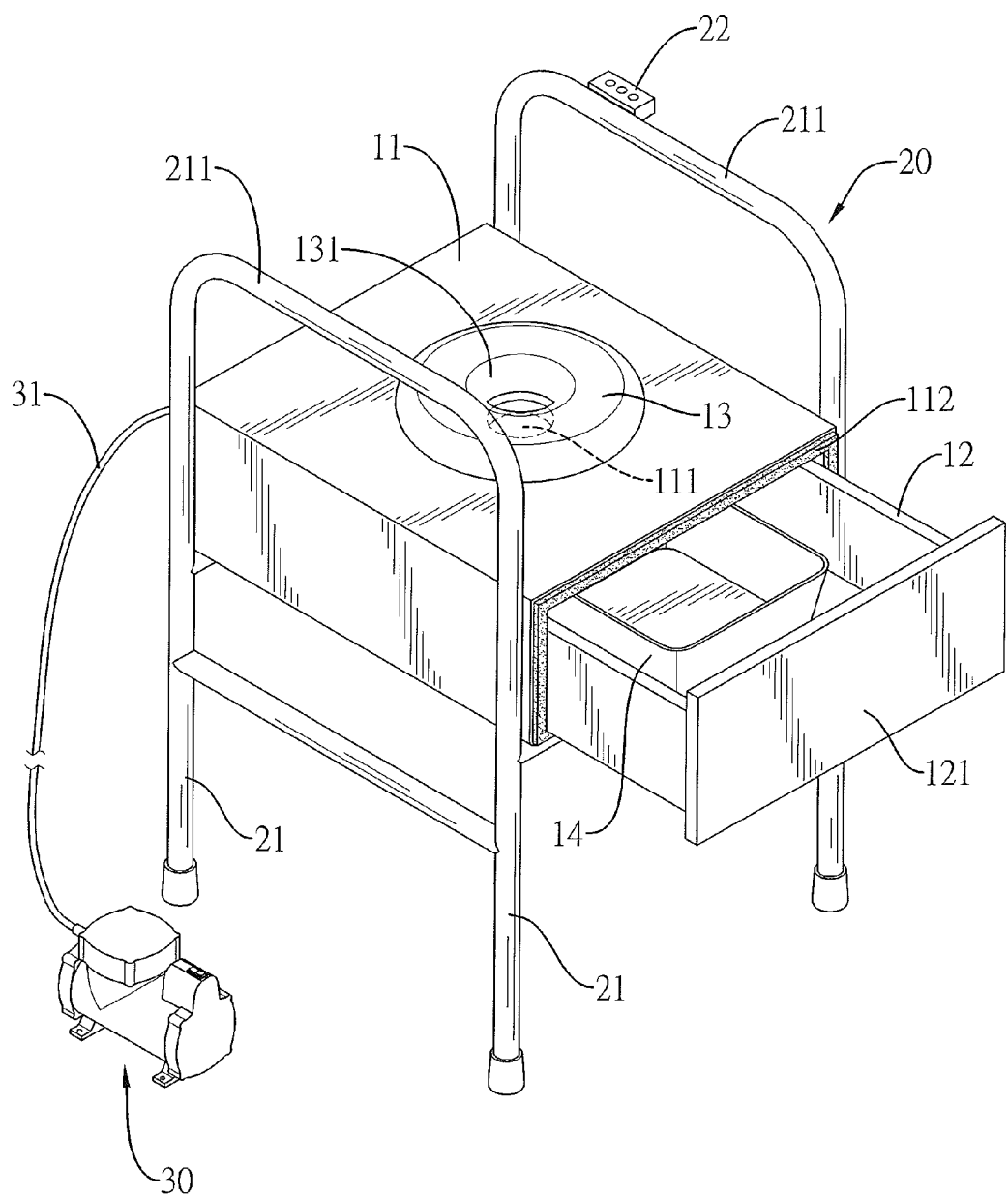
FIG. 2 is a perspective view of the seat-type air extracting suction apparatus of the present invention showing that the extraction box is opened.

With reference to FIGS. 1 and 2, the main body 10 has a loading housing 11, an extraction box 12, a seat cushion 13 and a collection container 14. The loading housing 11 is a rectangular and has an internal space. A sidewall of the loading housing 11 is formed with an opening communicating with the internal space. The loading housing 11 has a first through hole 111, a pad 112 and a second through hole 113. The first through hole 111 is defined through a top wall of the loading housing 11. The pad 112 is mounted around an outer edge of the opening of the loading housing 11. The second through hole 113 is defined through an opposite wall that is opposite to opening. The extraction box 12 is mounted through the opening of the loading housing 11 into the internal space. The extraction box 12 has a receiving space and a top opening. A wide-sized closed surface 121 is formed on a side of the extraction box 12. When the extraction box 12 is received in the loading housing 11, the closed surface 121 is pressed airtightly against the pad 112. The seat cushion 13 is mounted on the top wall of the loading housing 11. A guiding hole 131 is formed on the seat cushion 13 and is aligned with the first through hole 111. The collection container 14 is set in the receiving space of the extraction box 12 and is aligned with the first through hole 111.

The support frame 20 is connected to an outside of the main body 10 and has four supporting bars 21 and an activating switch 22. The supporting bars 21 are divided into two pairs mounted respectively on two opposite wall surfaces that are perpendicular to the opening of the loading housing 11, and the supporting bars 21 of each pair on the same wall surface is located close to an edge of the wall surface. The supporting bars 21 of each pair on the same wall surface has a crossbar 211 formed between the supporting bars 21. The crossbar 211 is provided as a handrail for users. The activating switch 22 is mounted on one of the crossbars 211.

The vacuum motor 30 is connected to the main body 10 and has an air pipe 31 and a pipe switch 32. The air pipe 31 is mounted airtightly through a wall of the loading housing 11. One of two open ends of the air pipe 31 is connected to the vacuum motor 30. The pipe switch 32 is mounted through the wall of the loading housing 11. The other open end of the air pipe 31 extends through a channel of the pipe switch 32 and communicates with the internal space of the loading housing 11. The pipe switch 32 is capable of interrupting communication between the air pipe 31 and the loading housing 11. Connection portions between the air pipe 31, the pipe switch 32 and the wall of the loading housing 11 are sealed. In a preferred embodiment, the vacuum motor 30 has low vacuum energy rate to restrict the vacuum degree performed by the vacuum motor 30.

Figure 3:
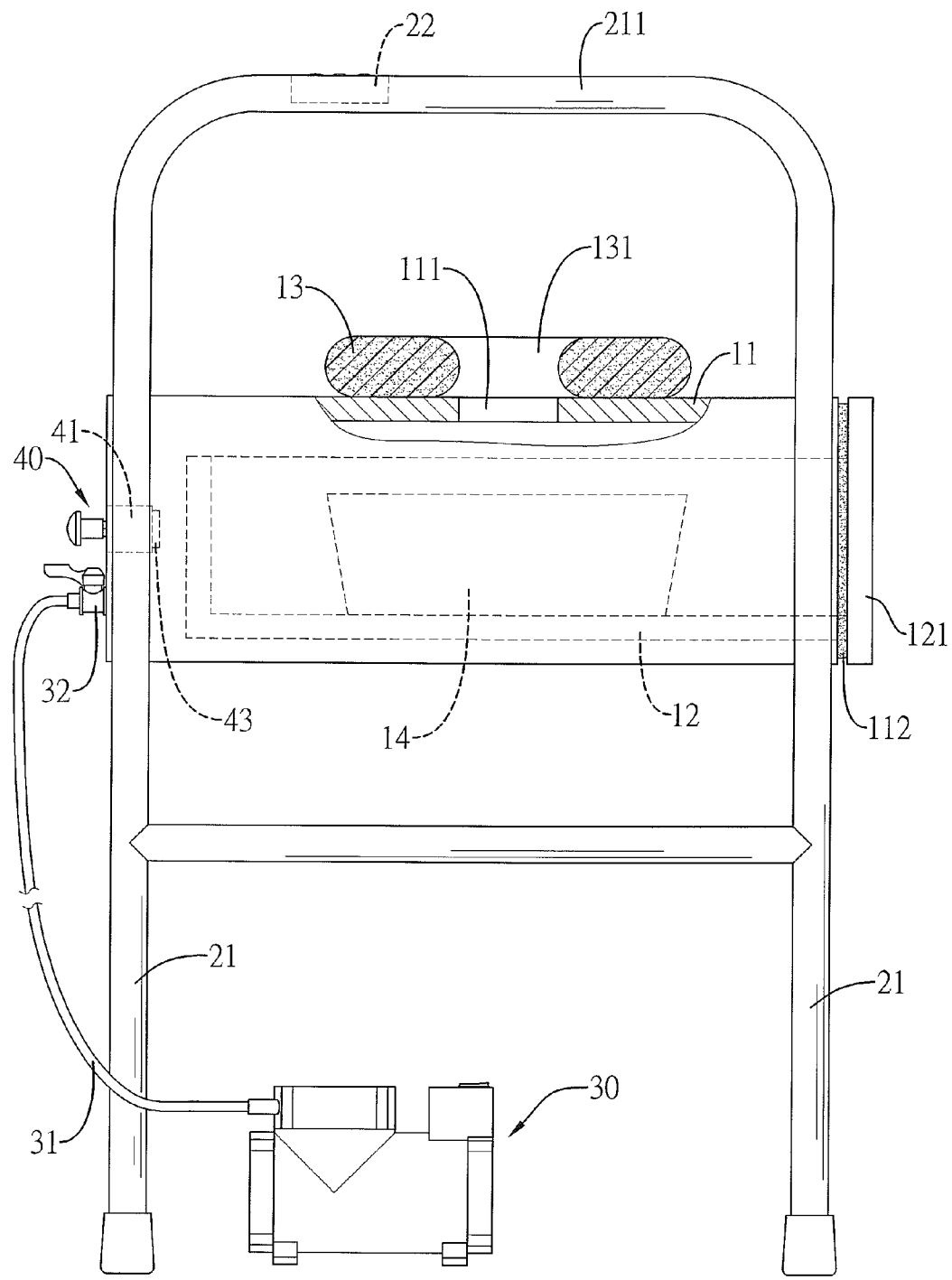
FIG. 3 is a side view in partial section of the seat-type air extracting suction apparatus of the present invention showing the extraction box.
Figure 4:
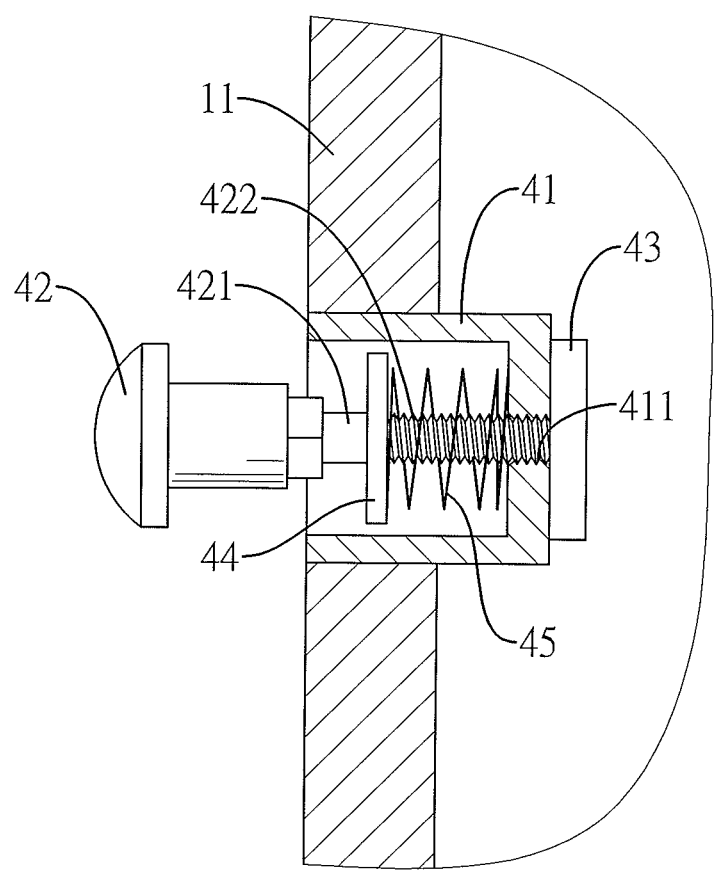
FIG. 4 is an operational view of the seat-type extracting suction apparatus of the present invention showing that a pressure regulation valve is closed.

With reference to FIGS. 3 and 4, the pressure regulation valve 40 is mounted through and connected to the loading housing 11 of the main body 10 and has a valve gate 41, a knob 42, a sealing lid 43, a valve gate O-ring 44 and a resilient element 45. The valve gate 41 is mounted in an internal wall of the loading housing 11 and corresponds to the second through hole 113. The valve gate 41 has a through hole defined through a wall of the valve gate 41, and an inner thread 411 is formed in the through hole. The knob 42 is has a pressing shaft 421 and an outer thread 422. The pressing shaft 421 is formed on a flat surface of the knob 42. The outer thread 422 is formed on an outer wall of the pressing shaft 421. The pressing shaft 421 extends through the second through hole 113. The outer thread 422 of the knob 421 engages the inner thread 411 of the valve gate 41. A distal end of the pressing shaft 421 extends in the loading housing 11. The sealing lid is mounted on the distal end of the pressing shaft 421. The valve gate O-ring 44 is mounted in the internal space of the valve gate 41. The resilient element 45 is mounted around the pressing shaft 421 and is located in the valve gate 41. Two ends of the resilient element 45 respectively abuts sidewalls of the valve gate O-ring 44 and the valve gate 41.

With reference to FIGS. 1 and 3, during the practical application of the present invention, the user sits in the seat cushion 13 of the main body 10. When the user is to excrete, the activating switch 22 is activated to turn on the vacuum motor 30. The vacuum motor 30 sucks air through communication of the air pipe 31. During air suction, pressure of the loading housing 11 is lowered such that negative pressure effect by air suction assist the user to excrete. The user's excreta will reach the collection container 14 through the guiding hole 131 and the first through hole 111.

Figure 5:
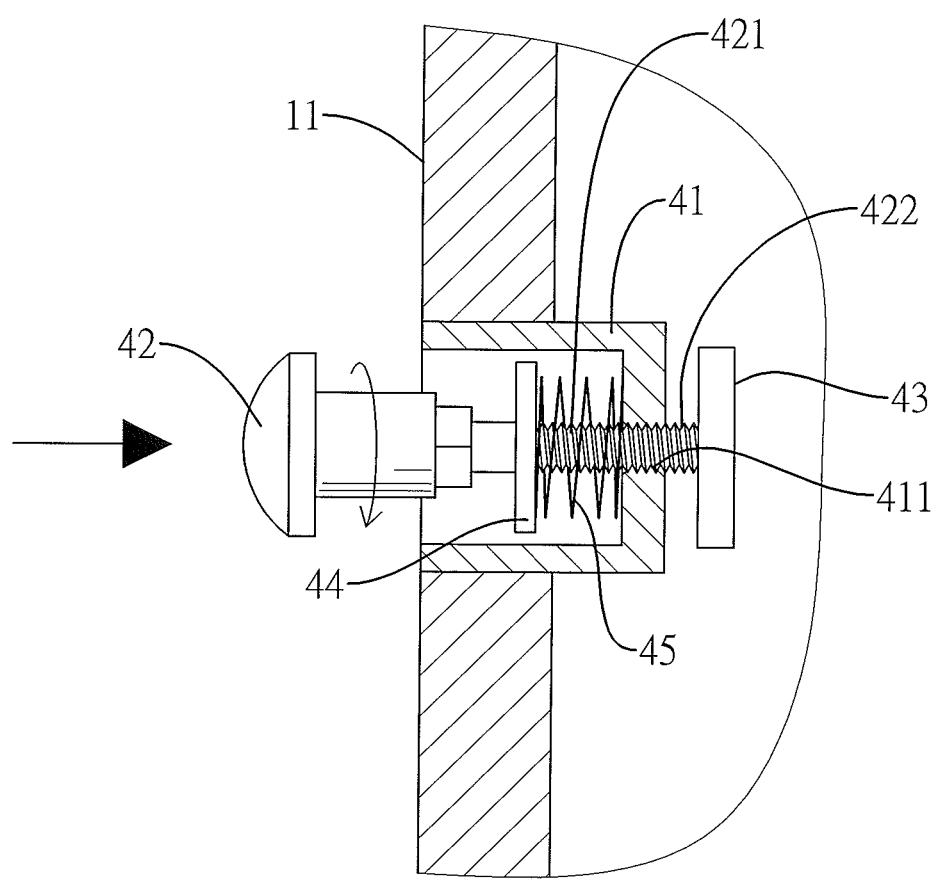
FIG. 5 is an operational view of the seat-type extracting suction apparatus of the present invention showing that a pressure regulation valve is opened to release the pressure.

With reference to FIGS. 4 and 5 the pressure regulation valve 40 of the present invention is a manual regulation device, the pressing shaft 421 of the knob 42 is mounted in the through hole of the valve gate 41 by threads. In an initial condition, the sealing lid 43 of the pressure regulation valve 40 is pressed against on an outer sidewall of the valve gate 41, which is the best sealing condition of the pressure regulation valve 40. When the vacuum motor 30 sucks air, pressure inside the loading housing 11 is lowered to form negative pressure. If suction force by the negative pressure is excessively high, the user may rotate the knob 42 to drive the pressing shaft to move down. Simultaneously valve gate O-ring 44 compresses the resilient element 45 such that pressing shaft 421 axially moves on the valve gate 41 to separate the sealing lid 43 from the outer wall of the valve gate 41. Controlling moving distance of the pressing shaft 421 adjusts the ambient air inlet flow and therefore regulates the internal pressure of the loading housing 11.

By the air suction function of the vacuum motor 30 exerted on the sealed internal space of the loading housing 11, negative pressure effect is generated in the internal space of the loading housing 11 such that the user with poor digestive function may be assisted to excrete. The pressure regulation valve 40 is mounted on the loading housing 11. The pressure regulation valve 40 is used for regulating internal pressure of the loading housing 11 to adjust negative pressure suction force of the present invention to the extent that comforts the user.

The aforementioned descriptions are preferred embodiments of the present invention instead of limiting the present invention in any form. Any persons of ordinary skill in the art, without departing out of the extent of the technical solutions of the present invention, may slightly change or modify the aforementioned technical contents to acquire equivalent embodiments. However, any simple changes, equivalent variants and modifications to the aforementioned embodiments according to the techniques of the present invention, not departing away from the technical contents of the present invention, are still in the extent of the technical solutions of the present invention.

What is claimed is:

1. A seat-type air extracting suction apparatus to aid bowel movement comprising:
   a main body having
      a loading housing being rectangular and having a first through hole defined through the loading housing;
      a seat cushion mounted on the loading housing and having a guiding hole formed on the seat cushion and aligned with the first through hole; and
      an extraction box mounted through the loading housing into an internal space of the loading housing and having a receiving space aligned with the first through hole;
   a support frame connected to an outside of the main body and having an activating switch;
   a vacuum motor connected to the main body and having an air pipe mounted airtightly through a wall of the loading housing, wherein one of two open ends of the air pipe is connected to the vacuum motor, and the other open end of the air pipe communicates with the internal space of the loading housing; and
   a pressure regulation valve is mounted through the loading housing,
   wherein the main body has a collection container, a sidewall of the loading housing is formed with an opening communicating with the internal space, the loading housing has a pad mounted around an outer edge of the opening of the loading housing, a wide-sized closed surface is formed on a side of the extraction box and is pressed airtightly against the pad, the collection container is set in the receiving space of the extraction box and is aligned with the first through hole.

2. The seat-type air extracting suction apparatus to aid bowel movement as claimed in claim 1, wherein the support frame has four supporting bars divided into two pairs mounted respectively on two opposite wall surfaces that are perpendicular to the opening of the loading housing, and the supporting bars of each pair on the same wall surface is located close to an edge of the wall surface, a crossbar is formed between the supporting bars of each pair, and the activating switch is mounted on one of the crossbars.

3. The seat-type air extracting suction apparatus to aid bowel movement as claimed in claim 1, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

4. The seat-type air extracting suction apparatus to aid bowel movement as claimed in claim 2, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

5. The seat-type air extracting suction apparatus to aid bowel movement as claimed in claim 1, wherein the pressure regulation valve has
   a valve gate mounted in an internal wall of the loading housing and corresponds to the second through hole and having a through hole defined through a wall of the valve gate and an inner thread formed in the through hole;
   a knob having
      a pressing shaft formed on a flat surface of the knob, and a distal end of the pressing shaft extending in the loading housing; and
      an outer thread formed on an outer wall of the pressing shaft and engaging the inner thread of the valve gate;
   a sealing lid mounted on the distal end of the pressing shaft;
   a valve gate O-ring mounted in the internal space of the valve gate; and
   a resilient element mounted around the pressing shaft and located in the valve gate, and two ends of the resilient element respectively abutting sidewalls of the valve gate O-ring and the valve gate.

6. The seat-type air extracting suction apparatus to aid bowel movement as claimed in claim 2, wherein the pressure regulation valve has
   a valve gate mounted in an internal wall of the loading housing and corresponds to the second through hole and having a through hole defined through a wall of the valve gate and an inner thread formed in the through hole;
   a knob having
      a pressing shaft formed on a flat surface of the knob, and a distal end of the pressing shaft extending in the loading housing; and
      an outer thread formed on an outer wall of the pressing shaft and engaging the inner thread of the valve gate;
   a sealing lid mounted on the distal end of the pressing shaft;
   a valve gate O-ring mounted in the internal space of the valve gate; and
   a resilient element mounted around the pressing shaft and located in the valve gate, and two ends of the resilient element respectively abutting sidewalls of the valve gate O-ring and the valve gate.

7. The seat-type air extracting suction apparatus to aid bowel movement as claimed in claim 3, wherein the pressure regulation valve has
   a valve gate mounted in an internal wall of the loading housing and corresponds to the second through hole and having a through hole defined through a wall of the valve gate and an inner thread formed in the through hole;
   a knob having
      a pressing shaft formed on a flat surface of the knob, and a distal end of the pressing shaft extending in the loading housing; and
      an outer thread formed on an outer wall of the pressing shaft and engaging the inner thread of the valve gate;
   a sealing lid mounted on the distal end of the pressing shaft;
   a valve gate O-ring mounted in the internal space of the valve gate; and
   a resilient element mounted around the pressing shaft and located in the valve gate, and two ends of the resilient element respectively abutting sidewalls of the valve gate O-ring and the valve gate.

8. The seat-type air extracting suction apparatus to aid bowel movement as claimed in claim 4, wherein the pressure regulation valve has
   a valve gate mounted in an internal wall of the loading housing and corresponds to the second through hole and having a through hole defined through a wall of the valve gate and an inner thread formed in the through hole;
   a knob having
      a pressing shaft formed on a flat surface of the knob, and a distal end of the pressing shaft extending in the loading housing; and
      an outer thread formed on an outer wall of the pressing shaft and engaging the inner thread of the valve gate;
   a sealing lid mounted on the distal end of the pressing shaft;
   a valve gate O-ring mounted in the internal space of the valve gate; and
   a resilient element mounted around the pressing shaft and located in the valve gate, and two ends of the resilient element respectively abutting sidewalls of the valve gate O-ring and the valve gate.

9. The seat-type air extracting suction apparatus to aid bowel movement as claimed in claim 1, wherein the support frame has four supporting bars divided into two pairs mounted respectively on two opposite wall surfaces that are perpendicular to the opening of the loading housing, and the supporting bars of each pair on the same wall surface is located close to an edge of the wall surface, a crossbar is formed between the supporting bars of each pair, and the activating switch is mounted on one of the crossbars.

10. The seat-type air extracting suction apparatus to aid bowel movement as claimed in claim 9, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

11. The seat-type air extracting suction apparatus to aid bowel movement as claimed in claim 10, wherein the pressure regulation valve has
   a valve gate mounted in an internal wall of the loading housing and corresponds to the second through hole and having a through hole defined through a wall of the valve gate and an inner thread formed in the through hole;
   a knob having
      a pressing shaft formed on a flat surface of the knob, and a distal end of the pressing shaft extending in the loading housing; and
      an outer thread formed on an outer wall of the pressing shaft and engaging the inner thread of the valve gate;
   a sealing lid mounted on the distal end of the pressing shaft;
   a valve gate O-ring mounted in the internal space of the valve gate; and
   a resilient element mounted around the pressing shaft and located in the valve gate, and two ends of the resilient element respectively abutting sidewalls of the valve gate O-ring and the valve gate.

12. The seat-type air extracting suction apparatus to aid bowel movement as claimed in claim 2, wherein the pressure regulation valve has
   a valve gate mounted in an internal wall of the loading housing and corresponds to the second through hole and having a through hole defined through a wall of the valve gate and an inner thread formed in the through hole;

a knob having
- a pressing shaft formed on a flat surface of the knob, and a distal end of the pressing shaft extending in the loading housing; and
- an outer thread formed on an outer wall of the pressing shaft and engaging the inner thread of the valve gate;

a sealing lid mounted on the distal end of the pressing shaft;

a valve gate O-ring mounted in the internal space of the valve gate; and a resilient element mounted around the pressing shaft and located in the valve gate, and two ends of the resilient element respectively abutting sidewalls of the valve gate O-ring and the valve gate.

13. The seat-type air extracting suction apparatus to aid bowel movement as claimed in claim 1, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

14. The seat-type air extracting suction apparatus to aid bowel movement as claimed in claim 13, wherein the pressure regulation valve has a valve gate mounted in an internal wall of the loading housing and corresponds to the second through hole and having a through hole defined through a wall of the valve gate and an inner thread formed in the through hole;

a knob having
- a pressing shaft formed on a flat surface of the knob, and a distal end of the pressing shaft extending in the loading housing; and
- an outer thread formed on an outer wall of the pressing shaft and engaging the inner thread of the valve gate;

a sealing lid mounted on the distal end of the pressing shaft;

a valve gate O-ring mounted in the internal space of the valve gate; and a resilient element mounted around the pressing shaft and located in the valve gate, and two ends of the resilient element respectively abutting sidewalls of the valve gate O-ring and the valve gate.

15. The seat-type air extracting suction apparatus to aid bowel movement as claimed in claim 1, wherein the pressure regulation valve has a valve gate mounted in an internal wall of the loading housing and corresponds to the second through hole and having a through hole defined through a wall of the valve gate and an inner thread formed in the through hole;

a knob having
- a pressing shaft formed on a flat surface of the knob, and a distal end of the pressing shaft extending in the loading housing; and
- an outer thread formed on an outer wall of the pressing shaft and engaging the inner thread of the valve gate;

a sealing lid mounted on the distal end of the pressing shaft;

a valve gate O-ring mounted in the internal space of the valve gate; and a resilient element mounted around the pressing shaft and located in the valve gate, and two ends of the resilient element respectively abutting sidewalls of the valve gate O-ring and the valve gate.

16. The seat-type air extracting suction apparatus to aid bowel movement as claimed in claim 9, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

17. The seat-type air extracting suction apparatus to aid bowel movement as claimed in claim 9, wherein the vacuum motor has a pipe switch mounted through the wall of the loading housing, one end of the air pipe is connected to the vacuum motor and the other open end of the air pipe extends through a channel of the pipe switch and communicates with the internal space of the loading housing.

18. The seat-type air extracting suction apparatus to aid bowel movement as claimed in claim 9, wherein the pressure regulation valve has a valve gate mounted in an internal wall of the loading housing and corresponds to the second through hole and having a through hole defined through a wall of the valve gate and an inner thread formed in the through hole;

a knob having
- a pressing shaft formed on a flat surface of the knob, and a distal end of the pressing shaft extending in the loading housing; and
- an outer thread formed on an outer wall of the pressing shaft and engaging the inner thread of the valve gate;

a sealing lid mounted on the distal end of the pressing shaft;

a valve gate O-ring mounted in the internal space of the valve gate; and a resilient element mounted around the pressing shaft and located in the valve gate, and two ends of the resilient element respectively abutting sidewalls of the valve gate O-ring and the valve gate.

* * * * *